United States Patent [19]

Yasuda et al.

[11] Patent Number: 5,029,236
[45] Date of Patent: Jul. 2, 1991

[54] RADIOTELEPHONE APPARATUS

[75] Inventors: Hiroshi Yasuda; Satoshi Yokoya; Nobutaka Takao, all of Kanagawa; Akira Todo, Saitama, all of Japan

[73] Assignee: Sony Corporation, Tokyo, Japan

[21] Appl. No.: 516,187

[22] Filed: Apr. 30, 1990

[30] Foreign Application Priority Data

May 10, 1989 [JP] Japan ................................. 1-116777
Jun. 21, 1989 [JP] Japan ................................. 1-158731

[51] Int. Cl.$^5$ ...................... H04B 1/03; H04M 1/02; H05K 7/20
[52] U.S. Cl. ..................................... 455/90; 455/117; 455/128; 361/384; 379/58; 379/428
[58] Field of Search .................. 455/115, 90, 117, 347, 455/127; 330/289, 298, 207 P; 379/429, 433, 437, 428–430, 424, 440, 445, 447, 452; 340/584, 588; 361/379, 384

[56] References Cited

U.S. PATENT DOCUMENTS

| 4,513,812 | 4/1985 | Papst et al. | 165/80 B |
| 4,628,992 | 12/1986 | Kennedy | 165/123 |
| 4,724,400 | 2/1988 | Luettgenau | 330/295 |
| 4,860,163 | 8/1989 | Sarath | 361/384 |
| 4,885,488 | 12/1989 | Cox | 310/68 R |

FOREIGN PATENT DOCUMENTS 2064264  6/1981  United Kingdom ................ 379/437

Primary Examiner—Reinhard J. Eisenzopf
Assistant Examiner—Chi H. Pham
Attorney, Agent, or Firm—Ronald P. Kananen

[57] ABSTRACT

A radiotelephone apparatus employed as a so-called portable telephone or a car telephone includes an outer casing, a chassis base plate provided in the outer casing and mounting an electronic circuit section containing above all a heated element or elements, and a fan containing section containing a heat sink and a fan device connected in a heat conductive relation with the chassis base plate. The electronic circuit section and the fan containing section within the outer casing are isolated from each other by an air current interrupting device for air cooling heated electronic components while preventing dust and dirt in the air from flowing into portions in the casing other than the fan containing section. An air intake window is provided in the vicinity of mechanically operating portion of the apparatus for self cleaning dust and dirt sucked by the air flow through the normal telephone operation.

10 Claims, 5 Drawing Sheets

RADIOTELEPHONE APPARATUS

BACKGROUND OF THE INVENTION

1. Field of the Invention

This invention relates to a radiotelephone apparatus which is employed as a portable telephone or a car telephone.

2. Description of the Related Prior Art

There has been proposed a radiotelephone apparatus in which, for transmission and reception of speech signals, the speech signal input from a mouthpiece is transmitted on one radio link, and the party's speech signal transmitted on the other radio link is received and output as the party's voice from an earpiece.

Among these radiotelephone apparatus are portable or car telephones of, for example, Cellular Mobile Telephones in which the speech signals are transmitted and received via the base station.

As an example of such radiotelephone apparatus, there is proposed an apparatus which is comprised of a main body operating as a so-called cradle section, and a so-called handset section which is detachably mounted on an outer casing of the main body.

The handset contains a microphone device for converting the speech signal into the electrical signal and a speaker device for converting the electrical signal into the received speech signal, and is so constructed that the user of the apparatus may put the microphone device and the speaker device near his or her mouth and near his or her ear, respectively.

The main body of the apparatus includes an outer casing, and on the outer side of which the handset is adapted to be retained detachably.

The main body of the apparatus also includes a transmitting circuit for processing electrical signals from the microphone device of the handset over a signal cable in predetermined manner and transmitting the processed signal as radio wave signals over an antenna together with predetermined signals for identifying the destination of transmission, and a receiving circuit for receiving radio wave signals transmitted from the base station over the antenna, processing the received radio wave signals in a predetermined manner to the electrical signal and driving the speaker device of the handset with the processed signals over the signal cable.

Meanwhile, the main body of the apparatus also includes a radio frequency signal amplifying circuit for amplifying the radio frequency signals to be transmitted.

This radio frequency signal amplifying circuit is provided with a power amplifying device which emit heat during operation If heated to higher than a predetermined temperature, the power amplifying device may become unable to perform a prescribed operation.

For this reason, with the above described conventional radiotelephone apparatus, the heat generated from the power amplifying device is radiated to the outside of the main body to prevent the output circuit and the interior of the outer casing from being heated to higher than predetermined temperatures.

In one embodiment, in a radiotelephone apparatus, a power amplifying device is mounted on the heat sink in the thermally conductive relation and the heat generated in the interior of the radio&telephone apparatus is radiated by the thermally conductive heat sink fins cooled by natural air flow.

However, this type of heat radiating device results in increased size and weight of the radiotelephone apparatus.

Hence, when the radiotelephone apparatus is mounted in the vicinity of the driver s seat in a vehicle, the oversized radiotelephone apparatus impedes other operations in the vehicle.

Meanwhile, when the apparatus is held by hand and used outdoors, for example, the increased size or weight of the apparatus is inconvenient for transportation.

Furthermore, when the apparatus is initially operated in so called hands-free operation with the handset left on the main body of the apparatus and then switched to the handset conversation, it arises an uncomfortable feeling in using the handset if surface of the handset is heated by the leaked heat from the main body which contains a heated power amplifying device.

Meanwhile, there is known a measurement instrument in which heat sink fins and a cooling fan device are provided in the casing of the instrument. This cooling system is so designed that outside air is sucked from an air intake window provided on the back panel of the outer casing to direct the air to the heat sink fins on which heated elements are mounted and the air is discharged from the inside of the outer casing via air outlet windows provided on the side of the outer casing.

However, dust and dirt contained in the air sucked at the air intake window tend to become affixed to the intake window, printed circuit board, and to various components in the outer casing.

If dust and dirt are heaped on the window it may cause degradation in air cooling performance. And if dust and dirt are heaped on the printed circuit board, or other components in the outer casing, there arises the risk that the components may become unable to operate or the electrically conductive patterns on the printed circuit board or electrical components mounted thereon may be shorted by the dust and dirt electrically and mechanically.

Also, since the dust and dirt heaped on the heat sink tend to impede heat radiation from the heat sink, the measuring instruments are usually provided in measuring or test chambers where a lesser amount of dust and dirt is produced.

Such concept of cooling the measuring instruments cannot desirably by applied to car telephones or portable telephones likely to be used outdoors since an exceedingly large amount of dust and dirt is entrained on outside are and, on windy days above all, the amount of sand and or dust and dirt entrained in outside air is exceedingly increased.

OBJECT AND SUMMARY OF THE INVENTION

It is therefore an object of the present invention to provide a radiotelephone apparatus allowing, by the cooling fan, to cool an electronic circuit section inclusive of heated elements enclosed in an outer casing of the apparatus also containing the printed circuit board for the electronic circuit and electric components without the risk of degradation in cooling performance due to heaped dust and dirt on the air intake window or due to sucked dust and dirt into the outer casing.

For accomplishing the above object, the present invention provides a radiotelephone apparatus comprising an outer casing, a chassis base plate accommodated in the outer casing and having mounted thereon an electronic circuit section inclusive of heated elements, and a cooling fan containing section containing a fan device and heat sink fins located on said chassis base plate in a forced air cooling relation therewith, wherein the electronic circuit containing section and the cooling fan containing section in the outer casing are isolated from each other by air flow interrupting means.

With the radiotelephone apparatus of the present invention, since the cooling fan proper of the cooling fan device is provided on the side of the fan containing section in the outer casing which is isolated from the electronic circuit containing section therein by means of air flow interrupting means, the air sucked by the cooling fan device cools the heated elements and the air heated by cooling the element is discharged out of the outer casing without being diffused in the outer casing.

It is a further object of the present invention to maintain sufficient air intake performance providing the air intake window at or in the vicinity of mechanically moving portion of the apparatus and substantially removing or wiping heaped dust and dirt from the air intake window by touch of the moving mechanical portion or the operating human body during the normal telephone operation.

It is a further object of the present invention by a part of sucked air flow between the handset and the main body of the apparatus to prevent the surface of the handset from being heated by the leaked heat from the main body which contains a heated power amplifying device at least when the apparatus is operated in so-called hands-free operation with the handset left on the main body of the apparatus.

Other objects of the present invention and advantages to be derived from the present invention will become more apparent from the following detailed description of the invention which is made in conjunction with the accompanying drawings.

DETAILED DESCRIPTION F THE PREFERRED EMBODIMENTS

Figure 1:
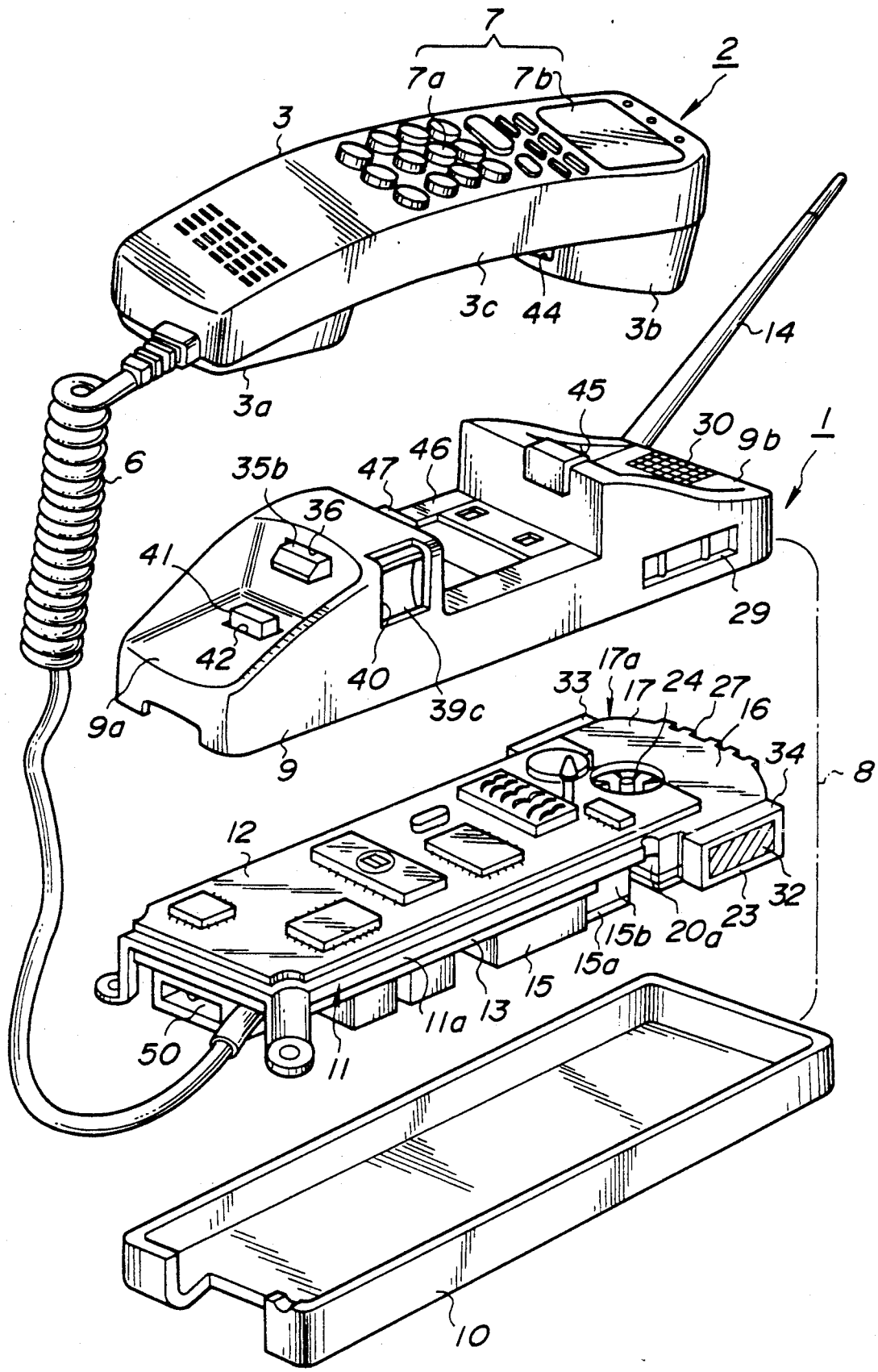
FIG. 1 is an exploded perspective view showing the arrangement of the radiotelephone apparatus according to the present invention.

A preferred embodiment of the present invention will be explained by referring to the drawings.

Figure 2:
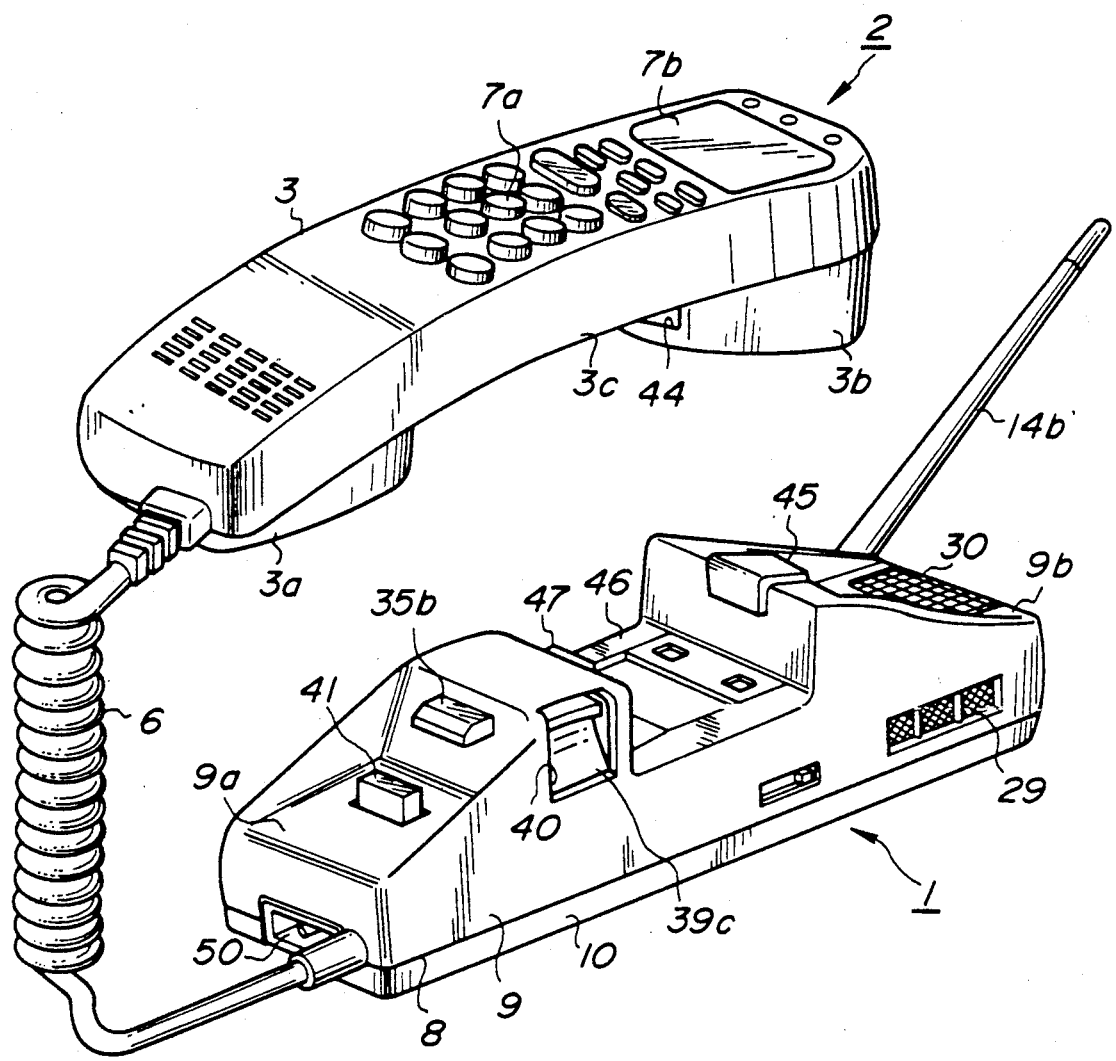
FIG. 2 is a perspective view showing the arrangement of the radiotelephone apparatus shown in FIG. 1.

As shown in FIGS. 1 and 2, a radiotelephone apparatus according to the present invention is comprised of a main body 1 called a cradle section, and a handset 2 removably mounted to the main body 1.

The main body 1 is provided with a transmitting circuit and a receiving circuit, and has the function of transmitting and receiving information signals as radio waves. The handset 2 has a unit for converting acoustic signals into electrical signals and a unit for converting electrical signals into acoustic signals, and is so arranged as to exchange information signals in the form of electrical signals between the handset 2 and the main body 1.

The handset 2 has a handset outer casing 3 which is provided with a grip section 3c and with a mouthpiece 3a and an earpiece 3b at either ends of the grip section 3c. The handset outer casing 3 is so arranged that the user of the radiotelephone apparatus may manually hold the grip section 3c to put the mouthpiece 3a at his or her mouth and the earpiece 3b at his or her ears.

Within the handset outer casing 3, a microphone device, which is a unit for converting the voice into electrical signals, and a speaker device, which is a unit for converting electrical signals into the voice, are provided in the mouthpiece 3a and the earpiece 3b, respectively. The electrical signals transmitted from the microphone device or to the speaker device are received by or transmitted to the main body 1 over a signal cable 6.

An operating device 7 for specifying the destination of transmitted information signals or generating predetermined signals for selection of the operational modes is provided on the grip section 3c. This operating device 7 is provided with a signal processing unit (CPU), a plurality of push buttons 7a including number keys 0, 1, 2, . . ., 8, 9 for entering dial numbers, on-hook key or a reserve key and a display device 7b for displaying the type of the current operational mode or the input dial numbers. This operating device 7 is so arranged as to transmit the above mentioned predetermined signals to the main body 1 over signal cable 6.

The main body 1 is comprised of an outer casing 8 consisting of an upper half 9 and a lower half 10 in connected abutting relation to each other.

A chassis base plate 11 is accommodated within the outer casing 8 of the main body and supported by the upper and lower halves 9, 10. The chassis base plate 11 is cast integrally from metals, such as aluminum, by so-called aluminum die casting.

First and second printed circuit boards 12, 13 are attached to the upper and lower surfaces of the chassis base plate 11, respectively. On these printed circuit boards 12, 13 are mounted the signal processing circuit or CPU, an A/D converter, a D/A converter, memories such as RAM and ROM and transmission circuit components of the signal system. Thus there are mounted a transmission circuit for processing electrical signals transmitted from the microphone device over the signal cable 6 and transmitting the processed signals and predetermined signals supplied from the operating device 7 over an antenna 14 provided on the main body 1 as radio waves, and a receiving circuit for receiving information signals supplied from a base station as radio waves via antenna 14, processing the received information signals in a predetermined manner and transmitting the processed signals to the speaker device over the signal cable 6.

A power source connector provided at the foremost part of a cord derived from a power source, such as a car battery, is removably connected to a power source terminal 50. Various operating components or devices may be actuated by the power source voltage supplied to the power source terminal 50.

On the second printed circuit board 13 is provided an output circuit 15 for affording a predetermined sufficient power to the radio waves transmitted from the antenna 14 and also affording a predetermined sufficient power to the voice emitted from the speaker device 5.

The output circuit 15 is constituted by power transistors, power ICs or the like, and emits heat during the operation, thus acting as a heat emitting member. The heat evolved during the operation of the output circuit 15 is transmitted to the chassis base plate 11 by way of a heat radiating member 15b connected to a heat radiating plate 15a connected in turn to the output circuit 15. This heat radiating member 15b is formed of a metal material having high heat conductivity, such as aluminum, and is provided in physical contact with both the heat radiating plate 15a of the output circuit 15 and with the chassis base plate 11 in heat conducting relation therewith.

A fan unit 16 is mounted on the chassis base plate 11 for radiating heat from the output circuit 15 to outside from within the outer casing 8 of the main body to prevent the temperature within the outer casing 8 of the main body from increasing beyond a predetermined value.

Figure 3:
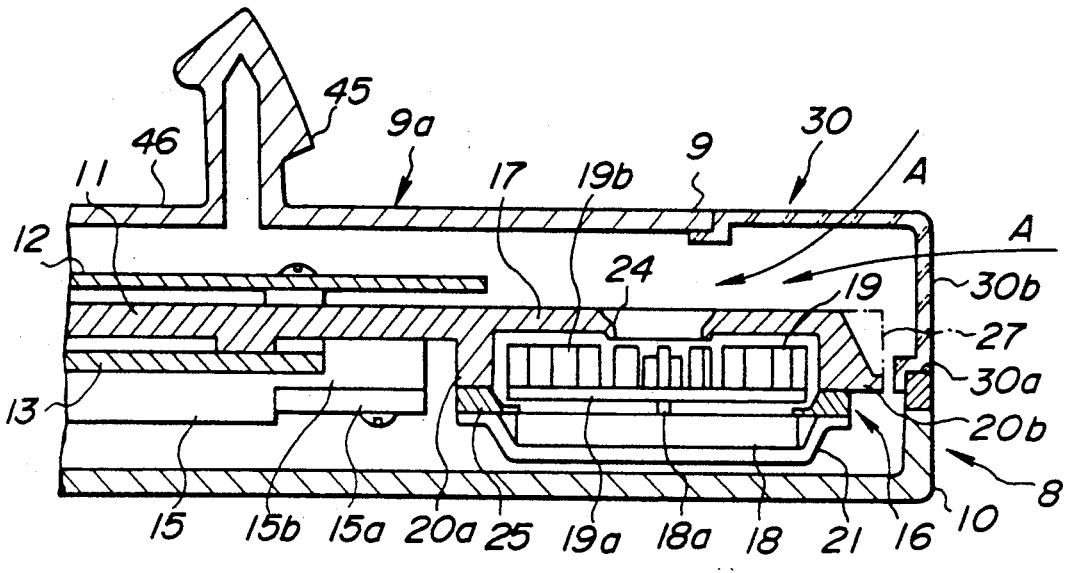
FIG. 3 is a diagrammatic longitudinal sectional view showing the arrangement of the cooling fan device of the radiotelephone apparaus shown in FIG. 1.
Figure 4:
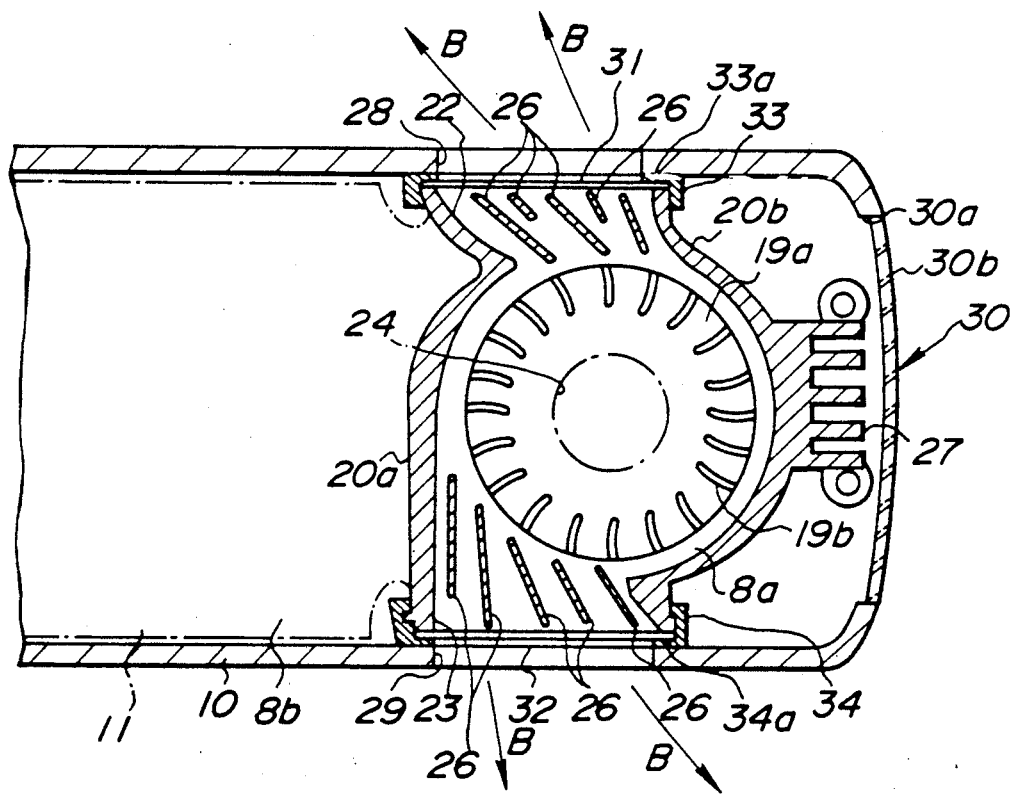
FIG. 4 is a diagrammatic transverse sectional view showing an arrangement of a cooling fan device of the radiotelephone apparatus shown in FIG. 1.

Referring to FIGS. 3 and 4, showing the fan device 16, a fan containing section 8a constituted by a ceiling plate 17 formed integrally with the chassis base plate 11 in continuation with the end portion of the base plate 11 and wall plates 20a, 20b formed integrally with the ceiling plate 17 for vertically depending from the plate 17, and a fan 19 driven into rotational movement by a driving motor 18 is contained within the fan containing section 8a. A motor supporting plate 21 is attached to the lower ends of the wall plates 20a, 20b. On the motor supporting plate 21 is attached the driving electric motor 18 having a driving output shaft 18a mounting the fan 19. This fan 19 is a so-called sirocco fan having a plurality of radially extending fins 19b formed on one surface of a disk-shaped base plate 19a mounted on the driving output shaft 18a. Between the upper perimetral surface of the motor supporting plate 21 and lower edges of the wall plates 20a, 20b, there is mounted a sealing member 25 of rubber or the like elastic material so as to be sandwiched by the supporting plate 21 and the wall plates 20a, 20b.

The wall plates 20a, 20b, the motor supporting plate 21 and the sealing member 25 as well as additional ring-shaped sealing members 33, 34 constitute air flow interrupting means. On both sides of the air flow interrupting means are formed discharge openings 22, 23, over which dust-proofing nets 31, 32 in the form of an extended metal sheet having numerous openings are mounted. On the perimeters of these discharge openings 22, 23 are provided the aforementioned ring-shaped sealing members 33, 34 formed of rubber or the like elastic material and having flanges 33a, 34a.

On both lateral sides towards one end of the upper half 9, there are formed air discharge ports 28, 29 in the form of through-holes in register with the discharge openings 22, 23. These sealing members 33, 34 are mounted on the perimeters of the discharge openings 22, 23 so that the flanges 33a, 34a are brought into elastic pressure engagement with the perimeters of the air discharge ports 28, 29. Thus the air discharged via discharge openings 22, 23 is necessarily discharged out of the outer casing 8 of the main body via air discharge ports 28, 29 without flowing into the inside of the outer casing 8. An air suction port 24 is formed at about the center along the width of the ceiling plate 17, while a plurality of fins 26 are formed by integral casting on the lower surface of the ceiling plate 17 so as to lie outside of the fan 19 and with a positional relation with respect to the discharge openings 22, 23. These fins 26 are formed radially for extending from the center of the ceiling plate 17 towards the discharge openings 22, 23 so as not to impede the flow of air from the center along the width of the ceiling plate 17 towards the discharge openings 22, 23.

At the above mentioned one end of the upper half 9, a plurality of cooling fins 27 are formed by integral casting on the outer surface of the wall plate 20b.

The upper half 9 is formed with an air intake section 30 in the vicinity of the suction port 24 provided in the fan containing section 8. A dust-proofing net 30b in the form of a thin extended metal sheet having numerous openings is similarly provided in register with an opening 30a of the air intake section 30. Thus the air intake section 30 is so arranged as to prevent larger dust particles from flowing into the inside of the outer casing 8 of the main body during influx of air into the inside of the outer casing 8 by the cooling fan device 16.

The cooling fan device 16 is adapted to such air via air intake section 30 formed for extending from one end face as far as a portion of the upper surface at one end of the upper half 9, and via air suction port 24, as shown by an arrow A in FIG. 3, while discharging the sucked air via discharge openings 22, 23 and air discharge ports 28, 29, as shown by an arrow 8 is FIG. 4. At this time, the air is discharged via air discharge ports 28, 29 to the outside of the outer casing 8 without flowing into the inside of the casing 8. Thus the air flow communication between the inside of the wall plate section 20 acting as the fan containing section 8a and the inside of an electronic circuit containing section 8b accommodating the output circuit 15 of the chassis base plate 11 therein is inhibited by air flow sealing means constituted by the wall plate section 20, motor supporting plate 21, sealing member 25 and the ring-shaped sealing members 33, 34 for the discharge openings 22, 23.

The cooling fins 27 are air-cooled by outside air which is admitted by the cooling fan device 16 via air intake 30. The fins 26 are also cooled by outside air which is admitted by the cooling fan device 16 into the inside of the wall plate section 20 so as to be discharged to the outside of the outer casing 8 along the fins 26. The heat emitted from the output circuit 15 is transmitted through the chassis base plate 11 as far as the ceiling plate 17 of the fan containing section, the fins 26 provided in the fan containing section and the cooling fins 27 so as to be radiated to the outside of the outer casing 8 of the main body to effect air cooling.

Meanwhile, the operation and cessation of operation of the cooling fan device 16 is controlled by a so-called thermostat, that is a temperature sensor, provided in the outer casing 8 of the main body, such that the operation of the fan device 16 is automatically started when the temperature in the outer casing 8 of the main body becomes higher than a predetermined temperature. Alternatively, the above mentioned air cooling system may be actuated by manually pressing an operating button, not shown.

Meanwhile, the portion of the upper half 9 which is disposed between both ends of the upper surface of the upper surface of the upper half 9 or between an earpiece receiving recess 9b and a mouthpiece receiving recess 9a, that is the portion of the upper half 9 in register with the grip section 3c, is formed as an attachment section 46 for attaching an adapter, such as an auxiliary battery, not shown. On one end of the attachment section 46, a retention pawl 47 for retaining the adapter is mounted for receding below or emerging above the surface of the upper half 9.

The auxiliary battery may be used as a power source when the radiotelephone apparatus is taken out of the car and hence the car battery cannot be used.

With the above described radiotelephone apparatus of the present invention, outside air is admitted by the fan device 16 into the inside of the wall plate section 20 and discharged along the fins 26 to the outside of the outer casing 8 of the main body to cool the fins 26. Heat evolved from the output 15 is transmitted through the chassis base plate 11 to reach the ceiling plate 17 of the fan containing section 8a and the fins 26 provided in the fan containing section so as to be radiated out of the outer casing 8.

The handset 2 is adapted to be detachably retained on the upper surface of the upper half 9. That is, a portion of the air intake section 30 is formed on the bottom surface of the earpiece receiving recess 9b.

Figure 5:
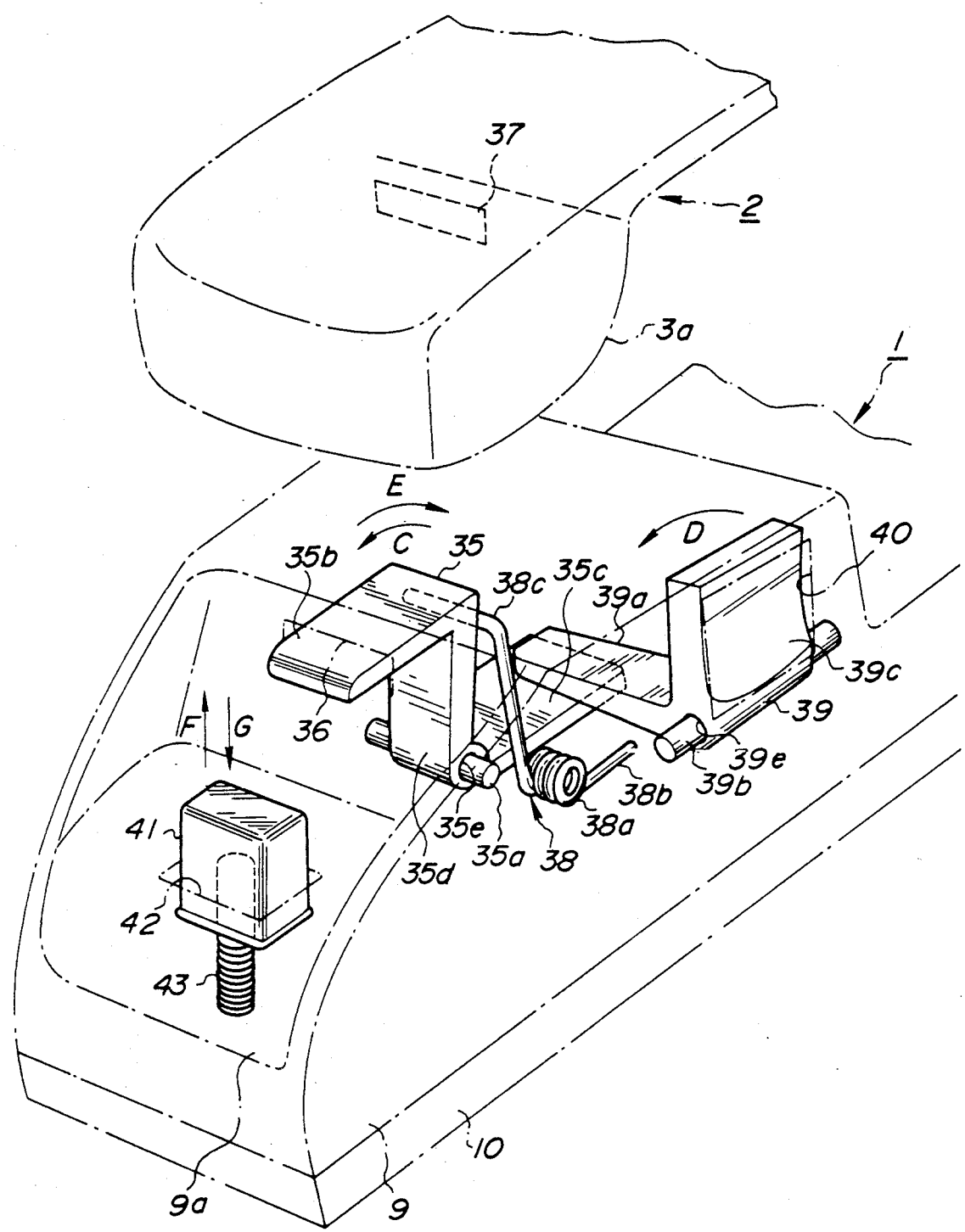
FIG. 5 is a perspective view showing essential parts of a handset retaining section of the radiotelephone apparatus shown in FIG. 1.

A locking lever 35 is provided at the other end of the upper half 9, as shown in FIG. 5. This lock lever 35 is formed as a letter L with an operated section 35c and a connecting section 35d. A supporting shaft 35a provided in the upper half 9 is passed through a through-hole 35e formed in a connecting portion between the actuated section 35c and the connecting section 35d so that the locking lever 35 is rotatably supported with respect to the supporting shaft 35a. The foremost part of the connecting section 35d is formed with a locking section 35b extending in a reverse direction to the actuated section 35c. This locking section 35b is exposed to the outside via a through-hole 36 at the mouthpiece receiving recess 9a. This through-hole 36 is formed at a position in register with an engaging opening 37 formed in the lateral surface of the mouthpiece section 3a towards the grip section 3c. This lock lever 35 is rotationally biased so that the locking section 35b is protruded outwards via through-hole 36, as shown by an arrow C in FIG. 5, under the pressure exerted by an arm section 38c of a lock lever biasing torsion coil spring 38 having its coil section 38a and the other arm section 38b retained and secured in position within the upper half 9.

An actuating lever 39 provided within the upper half 9 is similarly formed as a letter L with an actuating section 39a and a thrusting actuating section 39c. A supporting shaft 39b provided in the upper half 9 is passed through a through-hole 39e formed in a connecting portion between the actuating section 39a and the thrusting actuating section 39c so that the actuating lever 39 is rotatably supported with respect to the supporting shaft 39b. This actuating lever 39 has its thrusting actuating section 39c facing outwards via a through-hole 40 formed in the lateral surface of the upper half 9, with the actuating section 39a being kept in physical contact with the upper surface of the actuated section 35c of the locking lever 35. Thus the thrusting actuating section 39c may be thrust as with the finger's end to rotate the actuating lever 39 as shown by an arrow D in FIG. 5 to rotate the lock lever 35 against the bias of the locking lever biasing spring 38 as shown by an arrow E in FIG. 5.

On the bottom surface of the mouthpiece receiving recess 9a, a handset raising member 41 is supported so as to proceed into or be receded from the space above the bottom surface of the recess 9a via a through-hole 42 formed in the bottom surface. This raising member is biased by one end of a coil spring 43 in a direction of protruding via the through-hole 42, as shown by an arrow F in FIG. 5, with the other end of the coil spring being retained within the interior of the upper half 9.

On the inner lateral side of the earpiece receiving recess 9b is formed a projection 45 in register with a mating recess 44 formed on the lateral side of the earpiece section 3b towards the gripping section 3c.

In order for the handset 2 to be retained on the above described upper half 9, the projection 45 is fitted into the mating recess 44 of the earpiece section 3b and the mouthpiece section 3a is pushed into the mouthpiece receiving recess 9a. Thus the locking section 35b is thrust by the mouthpiece section 3a so that the locking lever 35 is rotated against the bias of the locking lever biasing spring 38. The raising member 41 is receded into the inside of the through-hole 21, as shown by an arrow G in FIG. 5, against the bias of the compression coil spring 43. When the mouthpiece section 3a is fitted into the mouthpiece receiving recess 9a until the engaging opening 37 is in register with the through-hole 36, the locking lever 35 is reset under the bias of the biasing spring 38 so that the locking section 35b is intruded into and engaged with the engaging openings 37 for retaining the handset 2 by the upper half 9.

For disengaging the handset 2 from the upper half 9, the thrusting actuating section 39c is thrust manually to rotate the locking lever 35 against the bias of the locking lever biasing spring 38. This disengages the locking section 35b from the engaging opening 37. At this time, the handset raising member 41 is protruded via through-hole 42 under the bias of the compression coil spring 43 to raise the mouthpiece section 3a while separating the handset 2 from the upper half 9.

With the above described apparatus, the air to be introduced by the cooling fan device 16 from air intake section 30 is passed by the mouthpiece section 3b of the handset 2 to reach the air intake section 30, so that the handset 2 and above all the mouthpiece sectin 3b thereof may be prevented from becoming heated by the air proceeding towards the air intake section 30.

In the above description, the air intake section 30 is provided at the mouthpiece receiving recess 9b of the main body 1. Alternatively, the fan device may naturally be provided in the vicinity of the earpiece receiving recess 9a and the air intake section 30 in the earpiece receiving recess 9a. In this manner, one may not feel hot at his or her ear or mouth during taking over the telephone even when he or she holds the handset 2 and draws it into contact with his or her ear or mouth.

Figure 6:
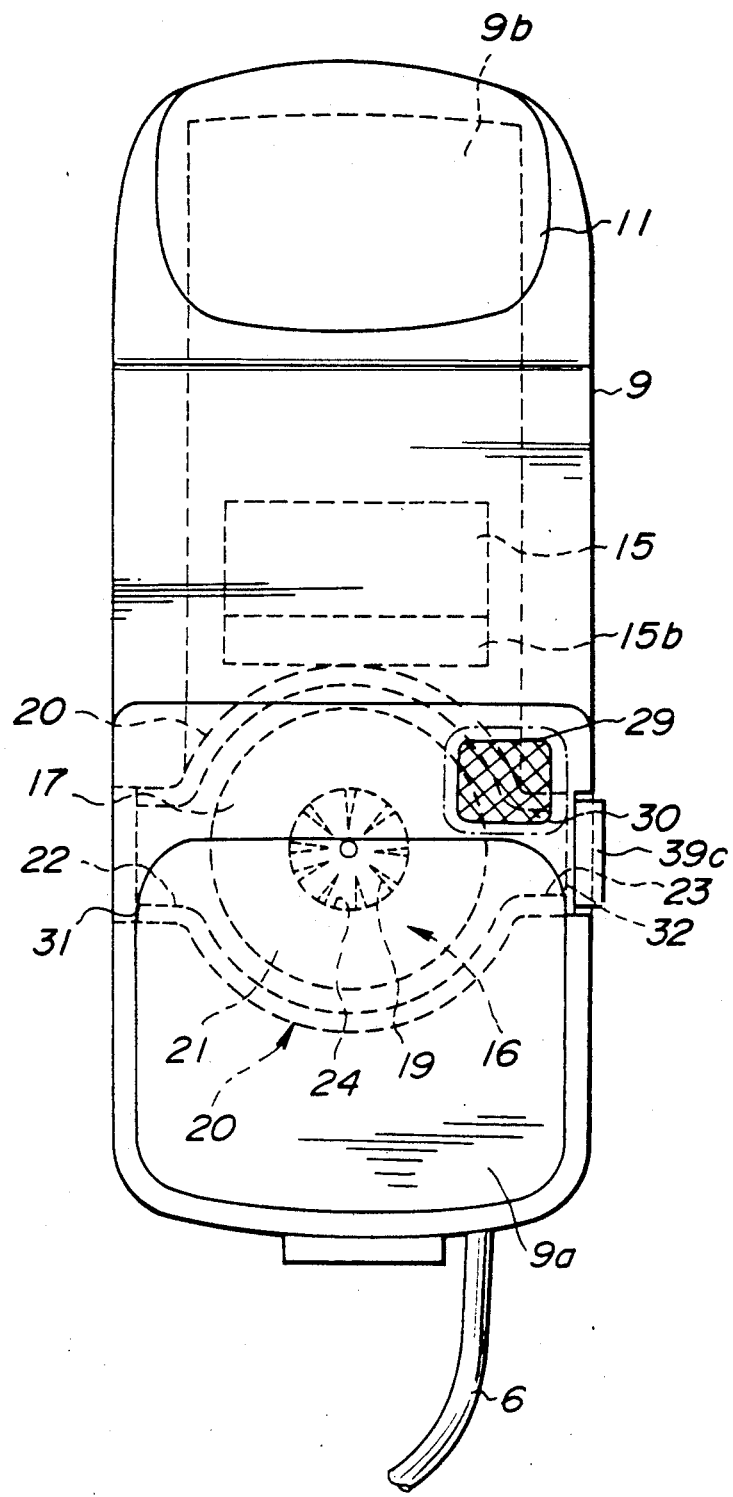
FIG. 6 is a plan view showing the main body of the radiotelephone apparatus according to a modification.

The present invention is not limited to the above described embodiment. For example, as shown in FIG. 6 illustrating a modification of the present invention, a through-hole may be provided in the vicinity of the thrusting actuating section 39c of the actuating lever 39 of the upper half 9 for functioning as the air intake section 30.

With the present embodiment, a heat emitting heated member 15 is connected integrally to the chassis base plate 1 by heat radiating member 15b. A fan device 16 is provided on the chassis base plate 11 in heat conducting relation therewith. The fan device 16 has its fan 19 accommodated in a fan containing section 8a constituted by a pair of wall plates 20, 20 and a motor supporting plate 21. These wall plates 20, 20 and the motor supporting plate 21 are connected to chassis base plate 11 in heat conducting relation therewith.

The air sucked into the air intake section 30 with fan rotation is sucked via through-hole 24 formed in the ceiling plate 17 integral with chassis base plate 11 so as to air cool the heating element, with the heated air being discharged out of the casing via an air discharge opening 23 provided below the thrusting actuating section 39c and an air discharge opening 22 provided in the opposite lateral side of the upper half 9 so as to be in register with the air discharge opening 23. The heated air may be necessarily discharged out of the casing without becoming diffused within the interior of the casing, as in the preceding first embodiment.

Although the separate air intake section 30 is provided in the above embodiment in the vicinity of the thrusting actuating section 39c, an interstice between the actuating lever 39 and the through-hole 40 confronted by the thrusting actuating section 39c of the actuating lever 39 may be used as the air intake section. With the actuating section and the vicinity thereof being used as the air intake section, not only the heating element 15 may be air cooled, but also the thrusting actuating section 39c, which may be touched by the user's finger during talk over the telephone may be prevented from becoming heated excessively. The air intake section may naturally be provided at any desired operating portions other than the actuating lever 39 for locking.

In the above described embodiments, a radiotelephone apparatus has been described in which the handset 2 and the main body 1 are separate units and electrically connected to each other by electrical cable 6. However, the radiotelephone apparatus in which the main body 1 and the handset 2 are accommodated within one and the same outer casing may also be covered by the present invention.

With the above described radiotelephone apparatus of the present invention, the fan 19 of the cooling fan unit 16 is mounted under interruption of an air flow communication with the section of the output circuit 15 within the outer casing 8 of the main body 1.

In this manner, the air discharged from the cooling fan device 16 is unexceptionally discharged out of the outer casing 8 without becoming diffused into the inside of the outer casing 8. On the other hand, the air heated by the heated output circuit 15 is not sucked into the cooling fan device 16.

Hence, with the above described radiotelephone apparatus, dust and dirt contained in atmospheric air may be prevented from becoming diffused into the outer casing 8 of the main body 1, while the inside of the casing 8 may be cooled satisfactorily.

The cooling fan device is not limited to the sirocco fan as described in the above embodiment, but may be comprised of various other forms of fans.

With the above described radiotelephone apparatus of the present invention, the fan of the cooling fan device is provided in the fan containing section which is isolated by air flow interrupting means from the electronic circuitry containing section containing the heated element in the outer casing. The result is that the air discharged by the cooling fan device is unexceptionally discharged out of the outer casing without becoming diffused therein.

Thus the present invention provides a radiotelephone apparatus in which various sections of the outer casing may be cooled satisfactorily and in which, even when the apparatus is used in a dusty environment, accidents such as malfunctions caused by the dust and dirt may be prevented reliably.

What is claimed is:

1. A radiotelephone apparatus comprising:
   an outer casing defining at least a part of an outside contour of said radiotelephone apparatus and adapted to enclose and protect various electronic components for receiving and transmitting radio signals, said outside contour of said casing adapted to facilitate human interaction with said radiotelephone apparatus;
   a heat conductive chassis base plate accommodated within said outer casing and mounted in a heat conductive relation with at least a portion of an electronic circuit section having a heated element or elements during operation;
   a cooling fan containing section comprising a fan device and a heat sink located on said chassis base plate, siad heat sink being air cooled forcedly by said cooing fan; and
   air flow interrupting means for preventing air sucked by said fan device into said outer casing from being discharged towards said electronic circuit section.

2. A radiotelephone apparatus comprising:
   an outer casing defining at least a part of an outside contour of said radiotelephone apparatus and adapted to enclose and protect various electronic components for receiving and transmitting radio signals, said outside contour of said casing adapted to facilitate human interaction with said radiotelephone apparatus;
   radio frequency transmitting means containing at lest a radio frequency amplifying device which emits heat during operation in said outer casing;
   an air cooling fan provided in said outer casing for substantially air cooling said amplifying device;
   an air intake window in said outer casing for intaking outside air for said air cooling fan; and
   mechanical moving means movable by a user, for operating a telephone function of said radiotelephone apparatus;
   wherein said air intake window is provided at a position registering with or in the vicinity of said mechanicai moving means, and whereby operation of said mechanical moving means results in a substantial removing or wiping of dust and dirt from said air intake window by at least incidental contact of a user or part of said mechanical moving means during normal operation of siad radiotelephone.

3. A radiotelephone apparatus according to claim 2, further comprising a handset adapted to be retained on said outer casing; and wherein said mechanical moving means is a handset retaining mechanism which retains said handset on said outer casing and which releases said handset from a retained position by interaction with a user's finger for radiotelephone operation.

4. A radiotelephone apparatus according to claim 2, further comprising a handset detachably retained on said outer casing; and wherein said mechanical moving means is a handset locking mechanism which locks said handset on said outer casing and which can be released by a mechanical action made by user.

5. A radiotelephone apparatus according to claim 2, wherein said mechanically moving means is a switch knob on said outer casing.

6. A radiotelephone apparatus according to claim 2, wherein said mechanically moving means is an antenna retraction mechanism.

7. A radiotelephone apparatus according to claim 2, further comprising a battery detachably placed on said outer casing; and wherein said mechanical moving means is a battery locking mechanism which locks said battery on said outer casing and which can be released by mechanical action made by user.

8. A radiotelephone apparatus comprising:
- a main body having a radio frequency transmitting means enclosed therein, said radio frequency transmitting means including at least a radio frequency amplifying device which emits heat during operation in said main body;
- an air cooling fan provided in said main body for forcedly air cooling said amplifying device;
- a handset detachably mounted on said main body; and
- an air intake window formed in said main body for intaking outside air for said air cooling fan;
- wherein at least a portion of said air intake window faces at least a portion of said handset mounted on said main body.

9. A radiotelephone apparatus according to claim 8, wherein said air intake window is provided at a position facing the earpiece portion or the mouthpiece portion of said handset, when in the mounted position of said handset on said main body.

10. A radiotelephone apparatus according to claim 8, wherein said air intake window is provided at a position where a portion of said handset touches said air intake window during handset handling action by user.

* * * * *